(12) United States Patent
Yang

(10) Patent No.: US 7,170,452 B2
(45) Date of Patent: Jan. 30, 2007

(54) PORTABLE COMPUTER

(75) Inventor: Chee-hwan Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/751,471

(22) Filed: Jan. 6, 2004

(65) Prior Publication Data

US 2004/0135730 A1    Jul. 15, 2004

(30) Foreign Application Priority Data

Jan. 6, 2003    (KR) .................... 10-2003-0000604

(51) Int. Cl.
*H01Q 5/01*    (2006.01)
*H01Q 1/48*    (2006.01)

(52) U.S. Cl. ...................... 343/702; 343/846

(58) Field of Classification Search ............... 343/702, 343/700 MS, 872, 846
See application file for complete search history.

(56) References Cited

U.S. PATENT DOCUMENTS

| | | | | |
|---|---|---|---|---|
| 5,874,920 A * | 2/1999 | Araki et al. | ................ | 343/702 |
| 5,896,109 A * | 4/1999 | Hachiga et al. | ............. | 343/702 |
| 6,081,207 A | 6/2000 | Batio | .......................... | 341/20 |
| 6,100,850 A * | 8/2000 | Utsumi | ....................... | 343/702 |
| 6,292,144 B1 | 9/2001 | Taflove et al. | ............... | 343/702 |
| 6,297,776 B1 * | 10/2001 | Pankinaho | ........... | 343/700 MS |
| 6,317,099 B1 * | 11/2001 | Zimmerman et al. | ....... | 343/803 |
| 6,344,823 B1 * | 2/2002 | Deng | .................. | 343/700 MS |
| 6,380,898 B1 | 4/2002 | Moore et al. | ................ | 343/702 |
| 6,388,627 B1 * | 5/2002 | Masaki et al. | ............... | 343/702 |
| 6,417,809 B1 * | 7/2002 | Kadambi et al. | ........... | 343/702 |
| 6,486,834 B2 * | 11/2002 | Tsai | ........................... | 343/702 |
| 6,809,689 B1 * | 10/2004 | Chen | .................... | 343/700 MS |
| 2002/0021250 A1 * | 2/2002 | Asano et al. | ................ | 343/702 |
| 2002/0123312 A1 * | 9/2002 | Hayes et al. | .................. | 455/90 |
| 2003/0234742 A1 * | 12/2003 | Tai et al. | ............. | 343/700 MS |
| 2004/0041734 A1 * | 3/2004 | Shiotsu et al. | .............. | 343/702 |
| 2004/0104853 A1 * | 6/2004 | Chen | ........................... | 343/702 |
| 2004/0174305 A1 * | 9/2004 | Kuo et al. | ................... | 343/702 |
| 2004/0234742 A1 * | 11/2004 | Johnson | .................... | 428/292.1 |

FOREIGN PATENT DOCUMENTS

| | | |
|---|---|---|
| EP | 1 258 944 | 11/2002 |
| KR | 10/237980 | 10/1999 |
| KR | 02/80101 | 10/2002 |

* cited by examiner

*Primary Examiner*—Don Wong
*Assistant Examiner*—Angela M Lie
(74) *Attorney, Agent, or Firm*—Staas & Halsey LLP

(57) ABSTRACT

A portable computer having: a main body; and a monitor in which a planar inverted F antenna (PIFA) is installed. The planar inverted F antenna has: a ground plane; a first radiator connected to the ground plane, spaced from the ground plane; and a second radiator connected to the first radiator, spaced from the first radiator, and with an end connected to an antenna cable. Thus, with only one planar inverted F antenna (PIFA), a multi-band function is performed, and frequency characteristics of a portable computer are improved, since to connect the antenna cable to an end of a planar inverted F antenna enables a frequency band to be broadened, compared with a conventional connection. Also, improvement of an installation structure of the planar inverted F antenna enables assembly and maintenance to be simplified, and manufacturing and repair costs to be reduced.

22 Claims, 8 Drawing Sheets

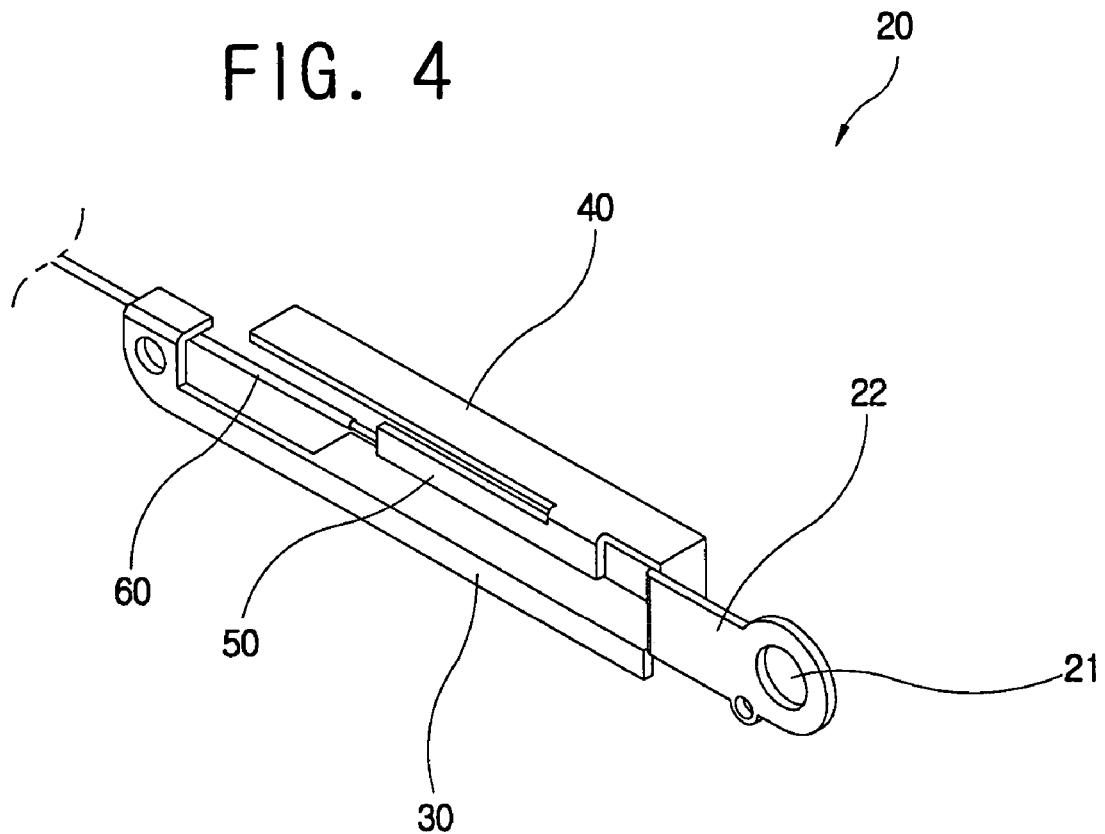

PORTABLE COMPUTER

CROSS-REFERENCE TO RELATED APPLICATIONS

This application claims the benefit of Korean Patent Application No. 2003-604, filed Jan. 6, 2003, in the Korean Intellectual Property Office, the disclosure of which is incorporated herein by reference.

BACKGROUND OF THE INVENTION

1. Field of the Invention

The present invention relates to a portable computer, and more particularly, to a portable computer mounted with a planar inverted F antenna.

2. Description of the Related Art

Generally, an antenna has a great effect on an efficiency of a wireless local area network (wireless LAN or WLAN), and has different operation characteristics according to various conditions, such as a shape, installation position, and installation method. Wireless LAN antennas are classified into internal antennas and external antennas. Internal antennas have excellent properties for portability and use, compared with external antennas. Due to theses advantages, demand for internal antennas has steadily increased. A representative antenna of internal antennas is a planar inverted F antenna.

A planar inverted F antenna (PIFA) used in a conventional portable computer, as shown in FIG. 1, comprises: a ground plane 2; a radiator 4 connected to the ground plane 2; and a feeding part 6 positioned on the radiator 4 and connected to an antenna cable. If a gap between the ground plane 2 and the radiator 4, the length of the radiator 4, and the position of the feeding part 6 are adjusted, the planar inverted F antenna with the above configuration can be adjusted to operate in an intended frequency band. This adjustment is called a tuning adjustment.

But the planar inverted F antenna with the above configuration can operate in only one frequency band, and therefore has difficulty in receiving various frequency bands. For example, a wireless LAN antenna used in a 2.4 GHz frequency band can operate in only the 2.4 GHz frequency band, and does not operate normally in other frequency bands.

Thus, to solve the problem, additional antennas may be installed, but the additional installation causes various problems, such as further crowding an already limited installation space, a need for a switching method, and a cost of the additional antennas.

Recently, a multi-band antenna capable of operating in a plurality of frequency bands has been produced. The installation structure of the recent multi-band antenna, however, is not only complex, but also a feeding point thereof connected to an antenna cable is inappropriate. As a result, the recent multi-band antenna can operate in dual bands, but has difficulty in operating in more than two bands.

SUMMARY OF THE INVENTION

Accordingly, it is an aspect of the present invention to provide a portable computer supporting multi-band communications, as well as improving a structure of a planar inverted F antenna (PIFA).

Additional aspects and advantages of the invention will be set forth in part in the description which follows and, in part, will be obvious from the description, or may be learned by practice of the invention.

The foregoing and/or other aspects of the present invention are achieved by providing a portable computer including a main body and a monitor, in which a planar inverted F antenna (PIFA) is installed, the planar inverted F antenna having: a ground plane; a first radiator connected to the ground plane, spaced from the ground plane; and a second radiator connected to the first radiator, spaced from the first radiator, and having an end connected to an antenna cable.

According to an aspect, the planar inverted F antenna is installed in an upper part of the monitor.

According to an aspect, the portable computer additionally has a screw engaging the planar inverted F antenna with the upper part of the monitor.

According to an aspect, the ground plane of the planar inverted F antenna is electrically grounded on a metal part of the upper part of the monitor.

According to an aspect, the monitor has an opening/closing part, with a casing, and the first radiator and the second radiator are respectively provided in the casing of the opening/closing part of the monitor.

According to an aspect, frequency bands of the first radiator and the second radiator are changed according to adjustment of at least one of a length of the first radiator, a length of the second radiator, and a gap between the first radiator and the second radiator.

According to an aspect, the second radiator is disposed in parallel with a side of the first radiator.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 4 is a perspective view of the planar inverted F antenna of FIG. 3A;

DETAILED DESCRIPTION

Figure 1:
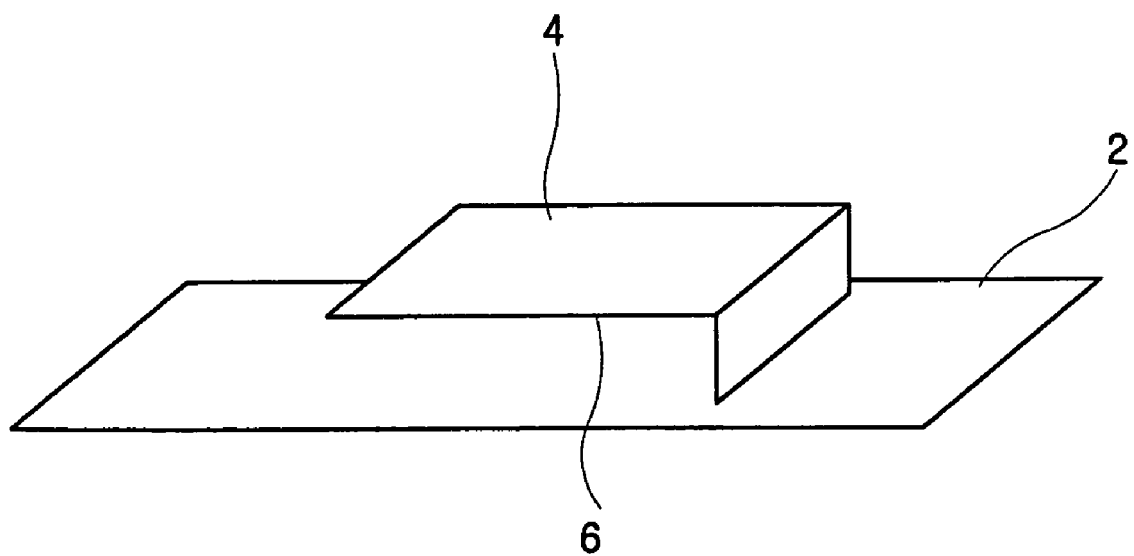
FIG. 1 is a perspective view of a conventional planar inverted F antenna.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
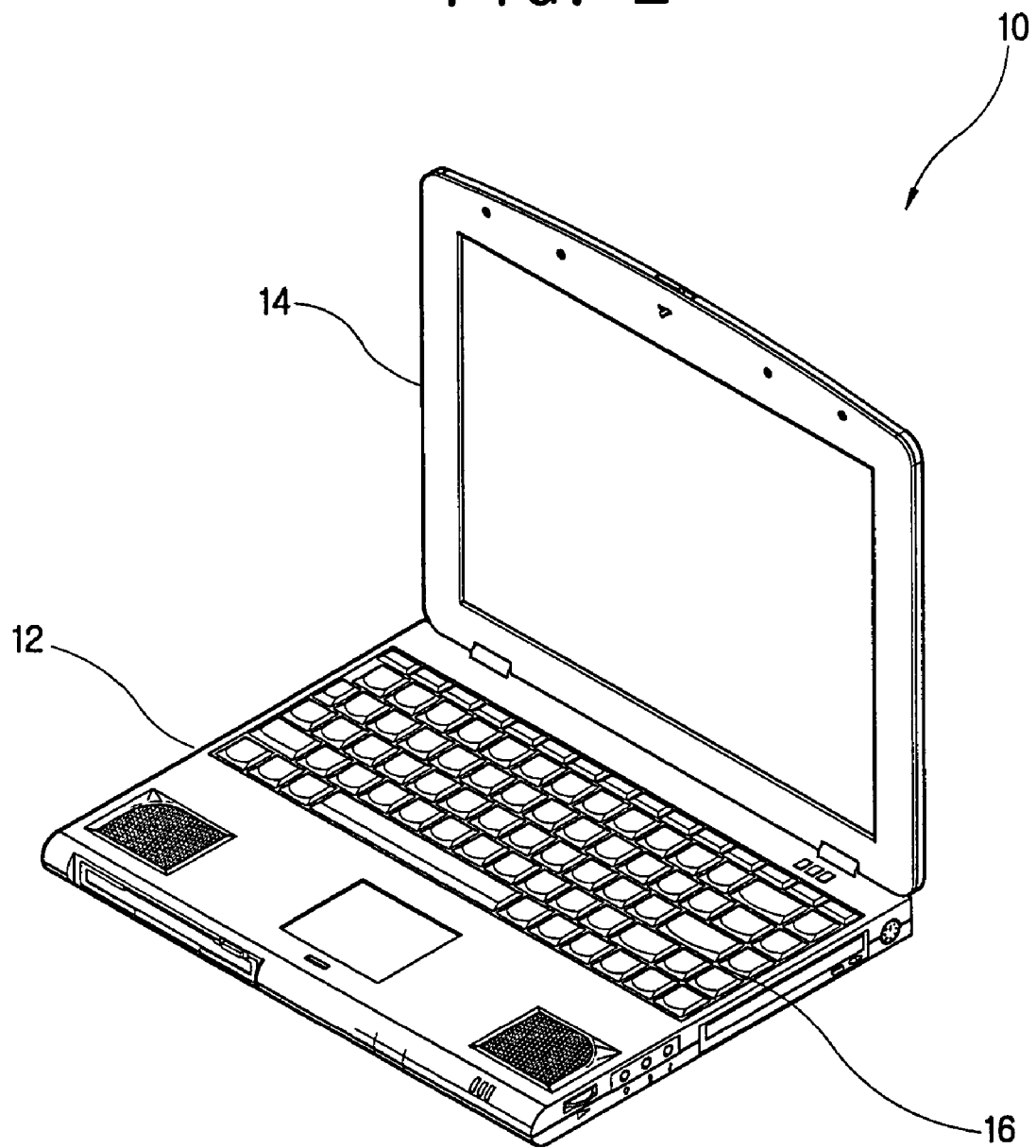
FIG. 2 is a perspective view of a portable computer according to an embodiment of the present invention.
Figure 3A:
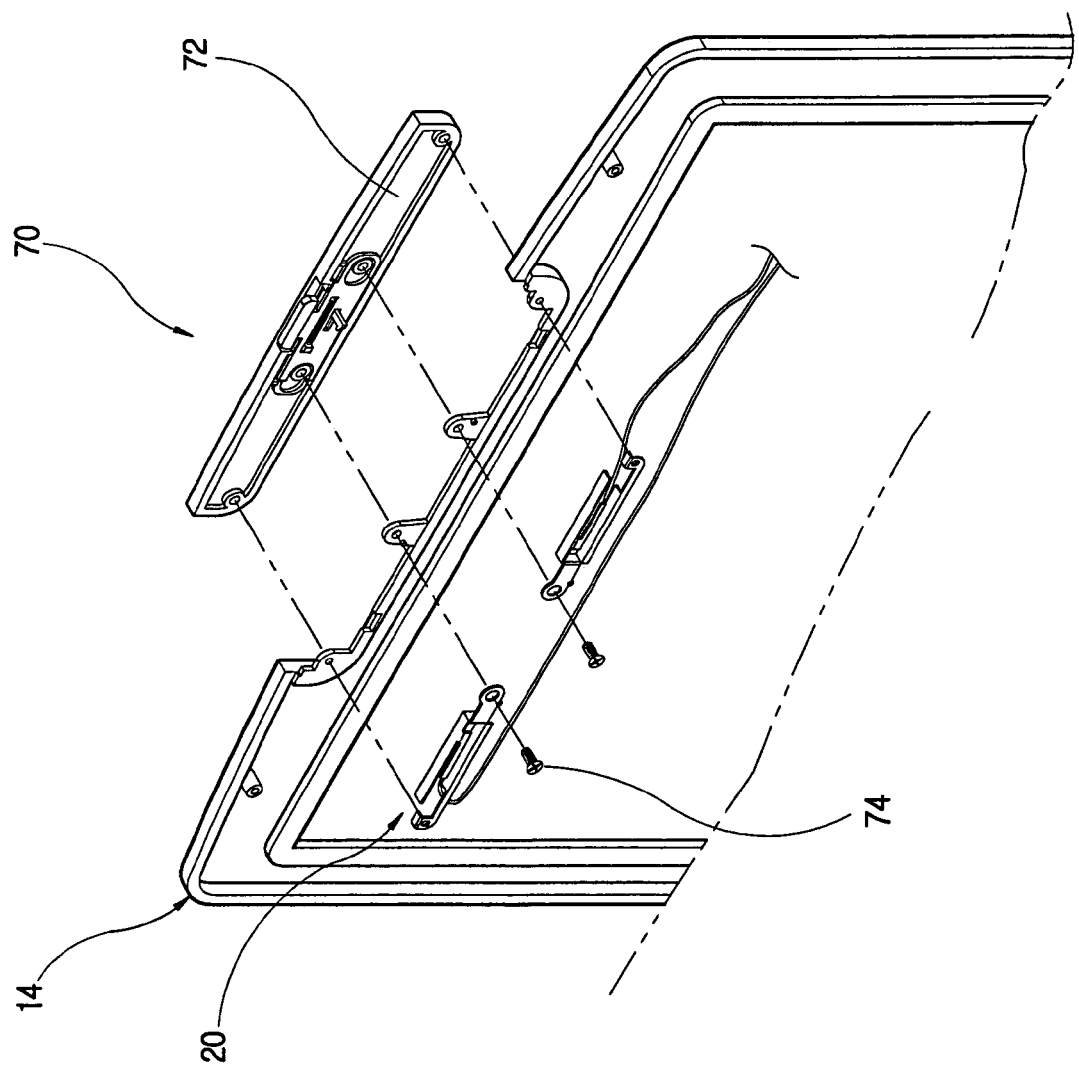
FIGS. 3A and 3B are perspective views illustrating how a planar inverted F antenna of the portable computer of FIG. 2 is installed.
Figure 3B:
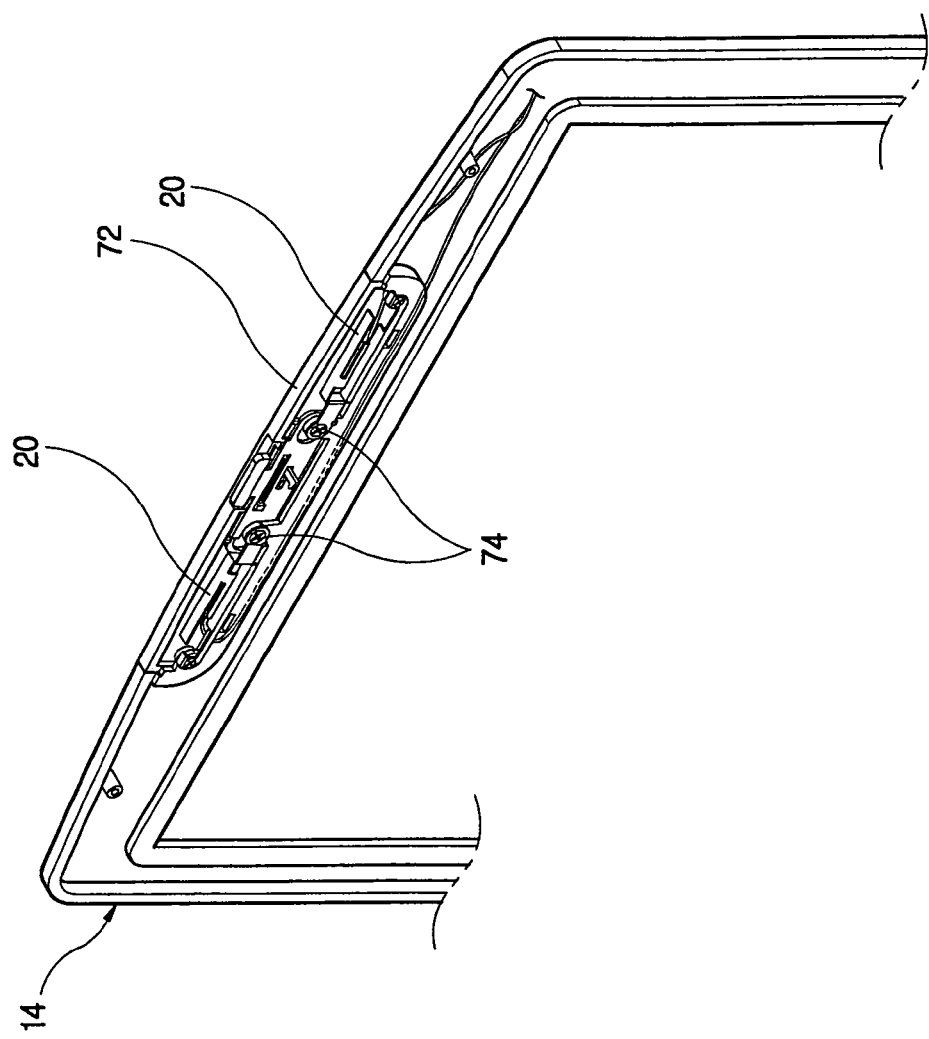

FIG. 2 is a perspective view of a portable computer 10 according to an embodiment of the present invention. FIGS. 3A and 3B are perspective views illustrating how a planar inverted F antenna 20 of the portable computer 10 of FIG. 2 is installed.

As shown in FIGS. 2, 3A, and 3B, the portable computer 10 has: a main body 12; a monitor 14 foldably mounted to the main body 12; and a keyboard 16 provided on an upper part of the main body 12.

A pair of planar inverted F antennas (PIFA) 20, which operate in frequency bands as internal antennas, are installed in the portable computer 10. The pair of planar inverted F antennas 20 are provided symmetrically in a casing 72 of an opening/closing part 70, and are electrically grounded on a metal part of an upper end of the monitor 14, so that a form factor of the portable computer 10 is slim, and space is used efficiently.

According to one embodiment of the present invention, the pair of planar inverted F antennas 20 are engaged to the casing 72 of the opening/closing part 70 by screws 74. According to another embodiment of the present invention, an engaging device other than the screws 74 are used.

Since the casing 72 is manufactured so that the planar inverted F antennas 20 are installed in an existing structure, installation is simplified and more economical, compared with planar inverted F antennas installed in other places.

Figure 5:
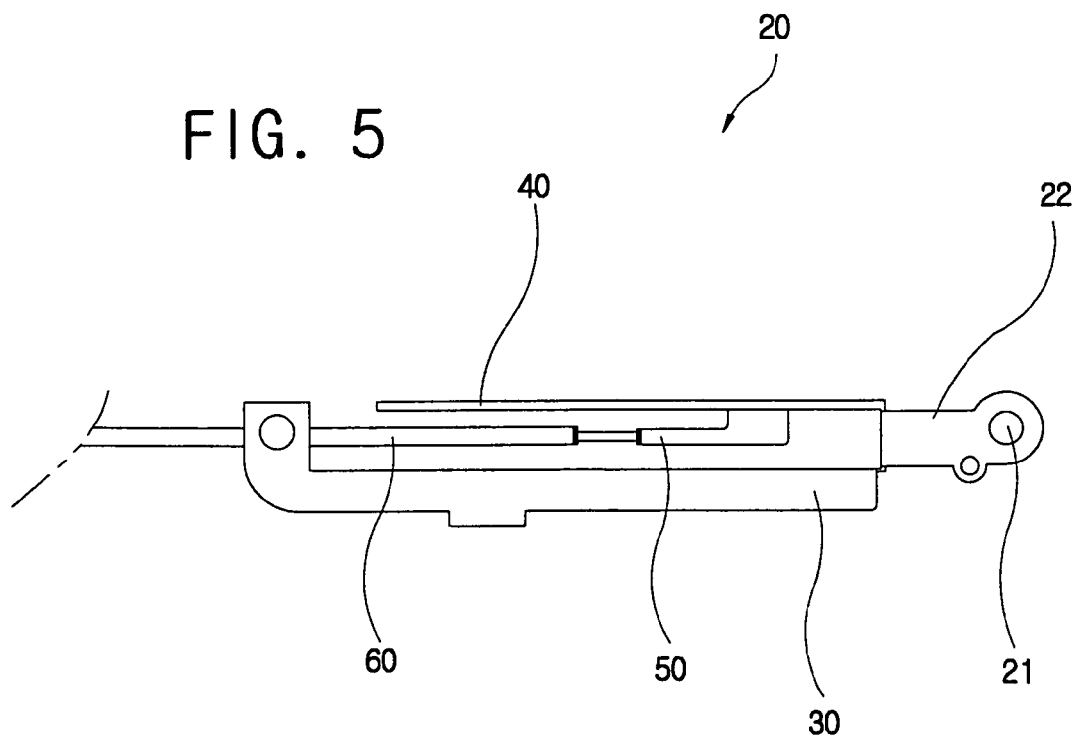
FIG. 5 is a front view of the planar inverted F antenna of FIG. 3A.

FIG. 4 is a perspective view of one of the pair of planar inverted F antennas 20 of FIG. 3A. FIG. 5 is a front view of one of the pair of planar inverted F antennas 20 of FIG. 3A. A configuration of the planar inverted F antennas 20 will be described with reference to FIGS. 3A–5.

As shown in FIGS. 4 and 5, each planar inverted F antenna 20 comprises: a ground plane 30; a first radiator 40 extending from a part of the ground plane 30, with a predetermined separation from the ground plane 30; and a second radiator 50 extending from the first radiator 40, disposed in parallel with the first radiator 40, and having a free end connected to an antenna cable 60.

According to one embodiment, the ground plane 30, the first radiator 40, and the second radiator 50 are integrally formed.

The ground plane 30 is electronically grounded by contacting a metal part of an upper end of the monitor 14, and the first radiator 40 and the second radiator 50 are provided in the casing 72 of the opening/closing part 70.

According to one embodiment, the first radiator 40 faces the ground plane 30, and the second radiator 50 is disposed in parallel with a side of the first radiator 40.

The first radiator 40 and the second radiator 50 are used in wireless LANs compliant to the IEEE802.11a/b/g standards, and the like, and respectively use frequency bands in and around 2.4 GHz and 5 GHz.

Adjusting a length of the radiators 40 and 50 or a gap between the first radiator 40 and the second radiator 50, enables the frequency bands of the first radiator 40 and the second radiator 50 to be adjusted. That is, the adjustment of the length, gap, or the like, enables various other frequency bands to be selectively used.

According to one aspect, the antenna cable 60 is welded to the end of the second radiator 50 so that the frequency band of the second radiator 50 can be broadened.

An engaging part 22 with a screw hole 21 is provided in one side of the planar inverted F antenna 20, for screw engagement.

Figure 6A:
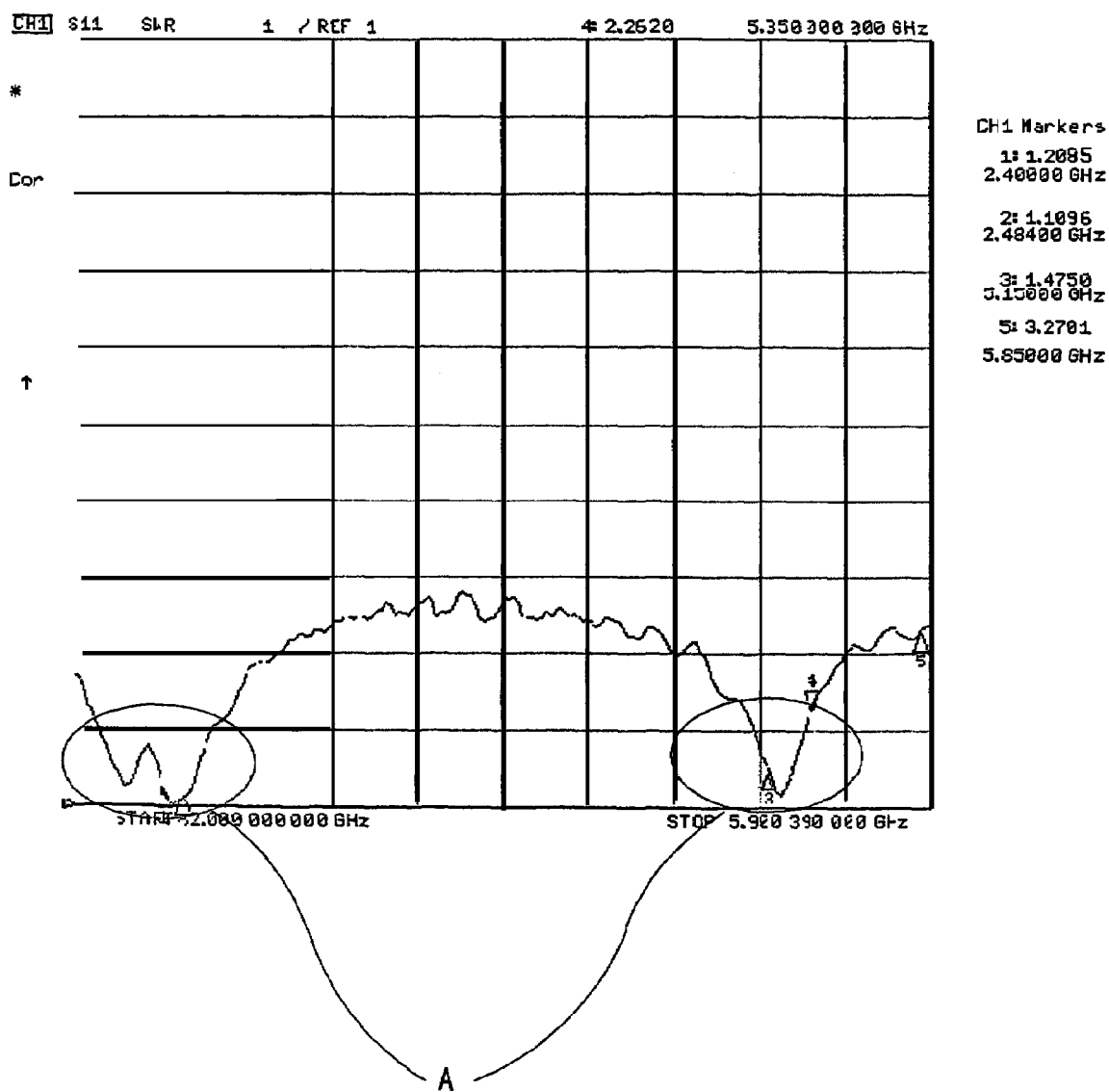
FIGS. 6A and 6B are graphs illustrating voltage standing wave rations (VSWR) according to feeding points of an antenna cable of the planar inverted F antenna of FIG. 3A.
Figure 6B:
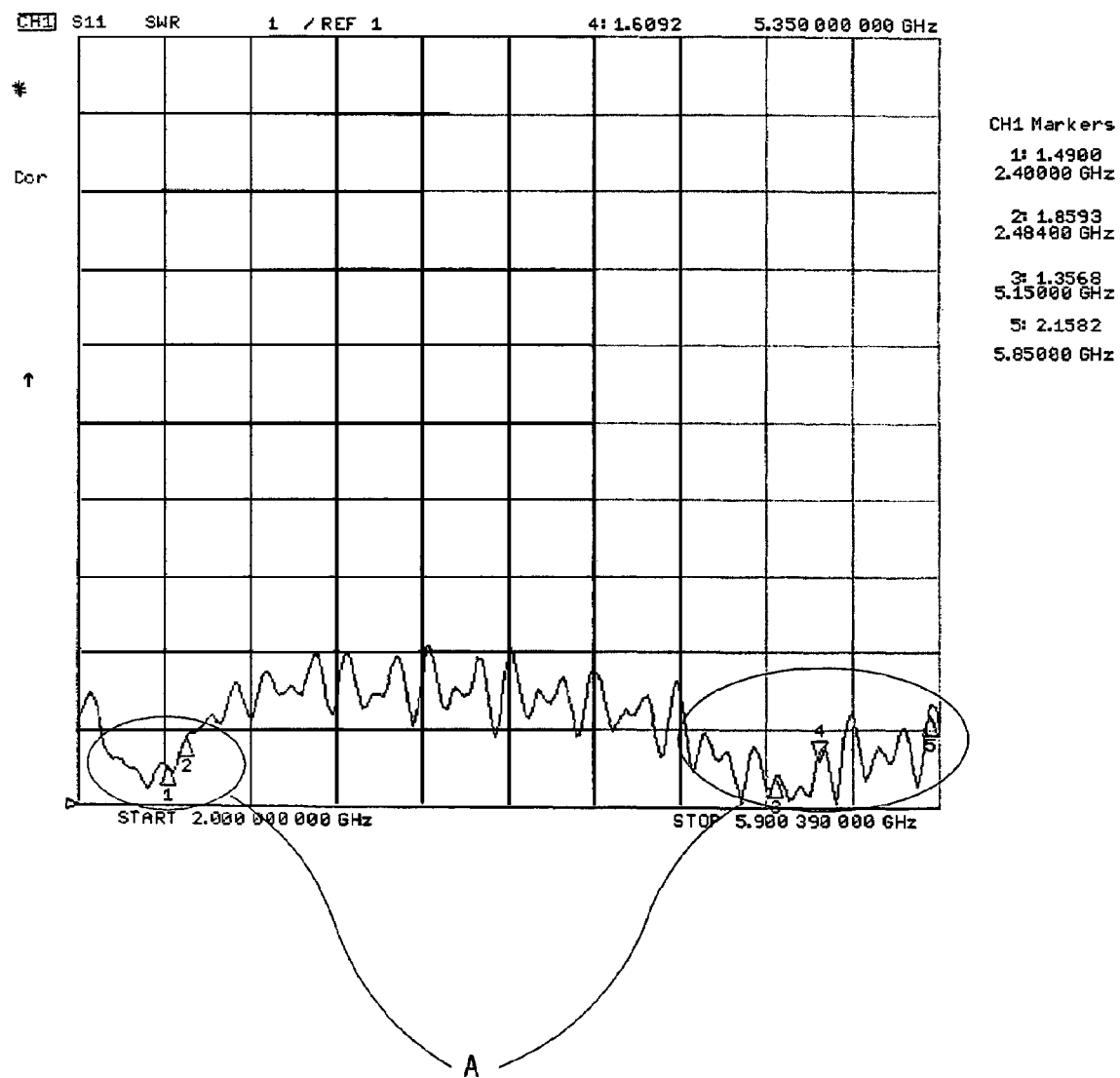

FIGS. 6A and 6B are graphs illustrating voltage standing wave rations (VSWR) according to feeding points connecting the antenna cable 60 to the planar inverted F antenna 20 of FIG. 3A.

When the feeding point of the antenna cable 60 is positioned in a middle of the second radiator 50, the planar inverted F antenna 20 receives frequencies only in two frequency bands: in and around 2.4 GHz, and 5 GHz as shown in FIG. 6A. That is, the planar inverted F antenna 20 can perform only a dual-band function.

But when the feeding point of the antenna cable 60 is positioned in the end of the second radiator 50, the planar inverted F antenna 20 receives frequencies in at least four frequency bands between 2.4 and 2.484 GHz around 2.4 GHz, and between 5.15 and 5.35 GHz, between 5.470 and 5.725 GHz, and between 5.725 and 5.825 GHz, around 5 GHz, as shown in FIG. 6B. That is, an operation region A of FIG. 6B is similar to that of FIG. 6A in and around 2.4 GHz, but is broadened around 5 GHz, compared with that of FIG. 6A, so that the planar inverted F antenna 20 can perform a multi-band function.

The above estimated result is described by way of example. Frequency characteristics are improved when the feeding point is located at the end of the second radiator 50, compared with feeding points that are located at other positions. Further, even though the frequency band of the planar inverted F antenna 20 is changed, the result is not changed.

The reference character A of FIGS. 6A and 6B refers to an operation region.

As described above, the portable computer 10, even with only one planar inverted F antenna (PIFA) 20 installed, performs a multi-band function, and frequency characteristics of the portable computer 10 are improved, since connecting the antenna cable 60 to the end of the planar inverted F antenna 20 enables the frequency band to be relatively broadened, compared with a conventional connection.

Also, improvement of an installation structure of the planar inverted F antenna 20 enables simplified assembly and maintenance, and thereby commensurately reduces manufacturing and repair costs.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A portable computer including a main body and a monitor, in which a planar inverted F antenna (PIFA) is installed, the planar inverted F antenna comprising:
    a ground plane;
    a first radiator connected to the ground plane extending, unsupported in a first direction, spaced from the ground plane, and having a first face,
    wherein the first face of the first radiator is disposed in parallel to the ground plane; and
    a second radiator connected to the first radiator spaced from the first radiator, extending, unsupported, in the first direction, and having an end connected to an antenna cable,
    wherein the second radiator is approximately perpendicular with the first face of the first radiator.

2. The portable computer according to claim 1, wherein:
    the planar inverted F antenna is installed in an upper part of the monitor.

3. The portable computer according to claim 2, further comprising:
    a screw engaging the planar inverted F antenna with the upper part of the monitor.

4. The portable computer according to claim 2, wherein:
    the ground plane of the planar inverted F antenna is electrically grounded on a metal part of the upper part of the monitor.

5. The portable computer according to claim 4, wherein the monitor comprises:
an opening/closing part with a casing,
wherein the first radiator and the second radiator are respectively provided in the casing of the opening/closing part of the monitor.

6. The portable computer according to claim 1, wherein:
frequency bands of the first radiator and the second radiator are changed according to adjustment of at least one of a length of the first radiator, a length of the second radiator, or a gap between the first radiator and the second radiator.

7. A planar inverted F antenna installed in a monitor of a portable computer, comprising:
a ground plane;
a first radiator connected to the ground plane and extending unsupported in a first direction, with a predetermined separation from the ground plane, and a primary face substantially parallel to the ground plane;
a second radiator connected at a first end thereof to the first radiator and extending, unsupported, in the first direction, and the second radiator is substantially perpendicular to the primary face of the first radiator; and
an antenna cable connected to a second end of the second radiator.

8. The antenna according to claim 7, wherein:
the antenna operates in more than two frequency bands.

9. The antenna according to claim 7, wherein:
the first and second radiators are substantially parallel.

10. The antenna according to claim 7, wherein:
the ground plane, the first radiator, and the second radiator are integrally formed of a single piece of material.

11. The antenna according to claim 7, wherein:
the frequency bands of the antenna are adjusted by adjusting at least one of a length of the first radiator, a length of the second radiator, or a gap between the first and second radiators.

12. The antenna according to claim 7, further comprising:
an engaging part, with which to mount the antenna.

13. A portable computer, comprising:
a main body;
a monitor; and
a planar inverted F antenna installed in the monitor, the antenna having
a ground plane,
a first radiator connected to the ground plane extending unsupported in a first direction, with a predetermined separation from the ground plane, and a primary face substantially parallel to the ground plane,
a second radiator connected at a first end thereof to the first radiator extending unsupported in the first direction,
wherein the second radiator is substantially perpendicular to the primary face of the first radiator, and
an antenna cable connected to a second end of the second radiator.

14. The portable computer according to claim 13, wherein:
the antenna operates in more than two frequency bands.

15. The portable computer according to claim 13, wherein:
the ground plane, the first radiator and the second radiator are integrally formed.

16. The portable computer according to claim 13, wherein:
the frequency bands of the antenna are adjusted by adjusting at least one of a length of the first radiator, a length of the second radiator, and a gap between the first and second radiators.

17. The portable computer according to claim 13, wherein the antenna comprises an engaging part to mount the antenna to the monitor.

18. The portable computer according to claim 17, wherein:
the engaging part has an opening, through which a fastener passes to mount the antenna to the monitor.

19. The portable computer according to claim 13, wherein:
the monitor comprises a metal part; and
the ground plane is electrically grounded by contacting the metal part.

20. The portable computer according to claim 13, further comprising:
a latch part to open and close the monitor with respect to the main body,
wherein the antenna is installed in the latch part.

21. A portable computer, comprising:
a main body;
a monitor; and
a planar inverted F antenna installed in the monitor, the antenna having
a ground plane;
a first radiator, having a first face, connected to the ground plane and extending unsupported, a first direction, with a predetermined separation from the ground plane,
wherein the first face of the first radiator is approximately parallel to the ground plane;
a second radiator connected at a first end thereof to the first radiator and extending, unsupported, in the first direction,
wherein the second radiator is approximately perpendicular with the first face of the first radiator; and
an antenna cable connected to a second, free end of the second radiator.

22. A portable computer comprising:
a main body;
a monitor; and
a planar inverted F antenna installed in the monitor, the antenna having
a ground plane;
a first radiator
connected to the ground plane,
extending, unsupported, in a first direction, and
having a primary face approximately parallel to the ground plane;
a second radiator
connected at a first end thereof to the first radiator,
extending, unsupported, in the first direction, and
having a primary face approximately perpendicular to the primary face of the first radiator; and
an antenna cable connected to a second end of the second radiator.

* * * * *

UNITED STATES PATENT AND TRADEMARK OFFICE
CERTIFICATE OF CORRECTION

| | | |
|---|---|---|
| PATENT NO. | : 7,170,452 B2 | Page 1 of 1 |
| APPLICATION NO. | : 10/751471 | |
| DATED | : January 30, 2007 | |
| INVENTOR(S) | : Chee-hwan Yang | |

It is certified that error appears in the above-identified patent and that said Letters Patent is hereby corrected as shown below:

Column 4, Line 46, change "plane" to --plane,--.

Column 4, Line 51, after "first radiator" insert --,--.

Column 5, Line 62, after "first radiator" insert --,--.

Column 6, Line 32, after "unsupported," insert --in--.

Signed and Sealed this

First Day of May, 2007

JON W. DUDAS
*Director of the United States Patent and Trademark Office*